US006803674B2

(12) United States Patent
Crisp

(10) Patent No.: US 6,803,674 B2
(45) Date of Patent: Oct. 12, 2004

(54) LOCK SYSTEM

(75) Inventor: David Crisp, London (GB)

(73) Assignee: ITW Limited, Fforestfach (GB)

( * ) Notice: Subject to any disclaimer, the term of this patent is extended or adjusted under 35 U.S.C. 154(b) by 0 days.

(21) Appl. No.: 10/311,982

(22) PCT Filed: Jun. 22, 2001

(86) PCT No.: PCT/GB01/02762

§ 371 (c)(1), (2), (4) Date: Dec. 20, 2002

(87) PCT Pub. No.: WO01/98120

PCT Pub. Date: Dec. 27, 2001

(65) Prior Publication Data

US 2003/0102957 A1 Jun. 5, 2003

(30) Foreign Application Priority Data

Jun. 22, 2000 (GB) .......................................... 0015328

(51) Int. Cl.[7] .............................................. B60I 9/00
(52) U.S. Cl. ................................................ 307/10.2
(58) Field of Search ............................. 307/9.1–10.2; 70/57, 58, 262–265; 340/5.1–5.92

(56) References Cited

U.S. PATENT DOCUMENTS

| | | | | | |
|---|---|---|---|---|---|
| 4,346,341 | A | * | 8/1982 | Blackburn et al. | 323/257 |
| 4,750,197 | A | * | 6/1988 | Denekamp et al. | 455/404.2 |
| 5,907,286 | A | * | 5/1999 | Kuma | 340/5.5 |
| 6,057,779 | A | * | 5/2000 | Bates | 340/5.21 |
| 6,081,199 | A | * | 6/2000 | Hogl | 340/5.28 |
| 6,362,778 | B2 | * | 3/2002 | Neher | 342/357.07 |
| 6,384,709 | B2 | * | 5/2002 | Mellen et al. | 340/5.2 |
| 6,392,592 | B1 | * | 5/2002 | Johnson et al. | 342/357.07 |
| 6,400,266 | B1 | * | 6/2002 | Brown, Jr. | 340/542 |
| 6,583,713 | B1 | * | 6/2003 | Bates | 340/5.21 |

* cited by examiner

*Primary Examiner*—Gregory J. Toatley, Jr.
(74) *Attorney, Agent, or Firm*—Barnes & Thornburg

(57) ABSTRACT

A lock system includes a lock unit (11) having a catch (13) and a memory (15). A key unit (21) has an aerial (25) for receiving location determining signals. The lock and key units establish a communications link (33) to release the catch (13) only when the location is a location stored in the memory (15). The lock system may be used to secure vehicles (1).

17 Claims, 5 Drawing Sheets

FIG 2
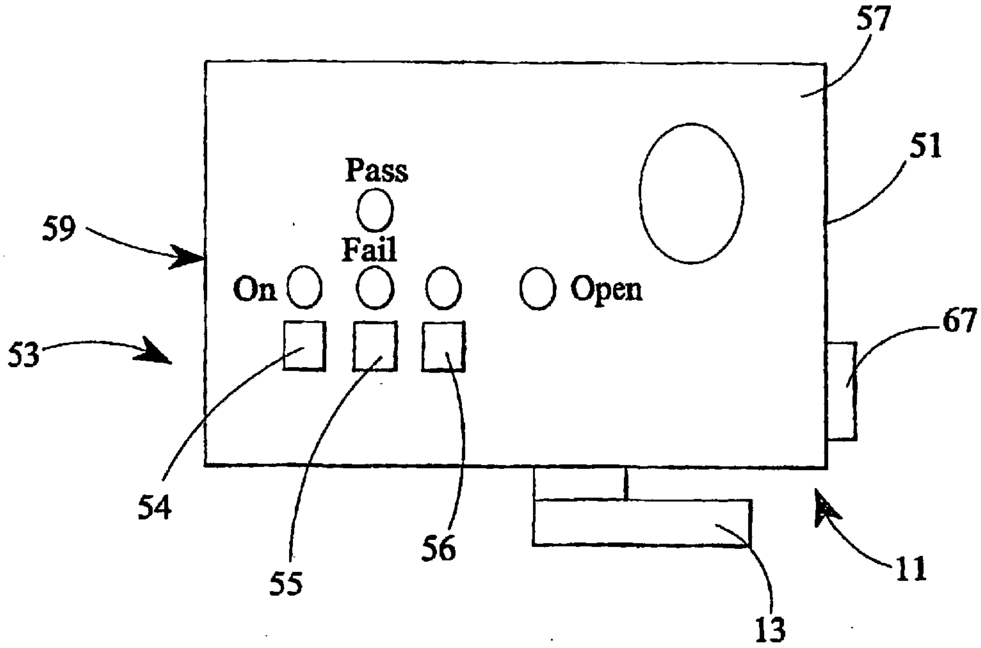
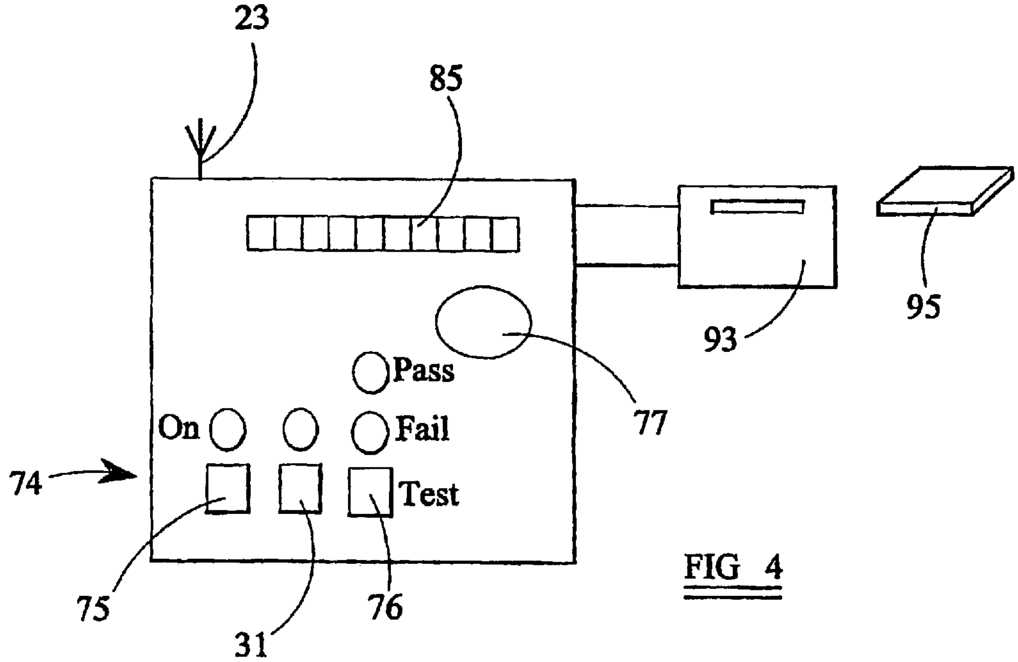
FIG 4

LOCK SYSTEM

The invention relates to lock systems, especially but not exclusively to lock systems suitable for securing loads on commercial vehicles.

Thefts of loads from vehicles are a major problem. Typically, commercial vehicles such as vans, lorries or trucks will have cargo bays secured by conventional vehicle lock or padlock and hasp systems, but these are not secure. In particular, since the driver of the vehicle is normally provided with a key to the cargo bay in order to be able to load and unload the vehicle, there is nothing to stop the driver unloading goods improperly at locations other than the authorised destination of the vehicle.

Accordingly, a number of systems to track the movements of vehicles have been proposed. Generally, these systems involve mounting a GPS receiver on the vehicle and monitoring the location of the vehicle on an ongoing basis. For example, U.S. Pat. No. 5,969,595 discloses a system including a GPS receiver mounted on the vehicle. The GPS receiver is used to determine the location of the vehicle when certain conditions occur. If the vehicle is not near a cargo destination when those conditions occur, an alarm signal is transmitted.

The GPS system operates using signals transmitted from a number of GPS satellites orbiting the earth. As will be known, each GPS satellite transmits data that indicates its location and the current time. An atomic clock synchronizes all satellites so that signals are transmitted at precisely the same time. Because of distance variation between satellites and the GPS receiver, data signals will arrive at the GPS receiver at slightly different times. The receiver uses the time difference between the receipt of signals from different satellites to determine the distance of each satellite and hence the location itself.

However, GPS receiving systems are expensive and providing all commercial vehicles in a fleet with GPS systems is often impracticable.

The power requirements of GPS systems are rather high and so in order to get sufficient power to run a GPS receiver continuously small batteries of the type conventionally incorporated in portable units are not suitable. Further, the GPS units need to be connected to a GPS aerial which can see a substantial portion of the sky, and therefore the aerial needs to be mounted on the outside of the vehicle. For security, the GPS unit itself should be mounted in an inconspicuous location within the vehicle. For all these reasons, it is difficult, time-consuming and expensive to install the GPS system in vehicles.

The costs of setting up a monitoring system are not limited to the costs of installing GPS receivers on vehicles. Monitoring equipment needs to be installed and the GPS locations of authorized drop-off points need to be determined. Managing and monitoring such complex systems is not trivial.

There therefore remains a need for a practical security system that is suitable for securing loads on vehicles without incurring excessive costs.

According to the invention there is provided a lock system comprising: a lock unit having a releasable catch for securing an article to be locked, and a memory for storing information about the intended destination of the article; and a key unit having a means for receiving location determining signals; wherein the lock unit and key unit are arranged to register together; the lock system further comprising a means operable to release the catch when the lock unit and the key unit are registered and when the location determined from location determining signals received in the key unit is a destination stored in the memory in the lock unit.

Thus, in the inventions the lock system has a lock unit which has the function of physically securing an article, and a separate key unit which can receive location determination signals. The key unit communicates with the lock unit which only opens when in the correct location.

By providing the power hungry receiver for location determination systems in the key unit and the lock unit can be made smaller and lighter. The lock unit may also have low power requirements since it does not need to communicate with GPS satellites on an ongoing basis.

The lock unit can therefore be smaller and easier to install than the GPS systems previously installed in vehicles.

In embodiments, the lock unit can even be a “padlock” type device which is completely separate from the vehicle, and which can be used to secure special loads without needing to upgrade fleet vehicles.

Even when larger lock units are used, it is still generally possible to provide internal batteries so that there is no need to connect the lock unit to vehicle power lines.

Furthermore, by providing the location determination signal receiver in the key unit there is no need to mount aerials for receiving location determining information on vehicles.

Moreover, by providing a means for receiving location determining information on the key unit it is possible to minimise the costs in setting up the system. The key units can simply be delivered to recipients of goods and can be used to receive location determining information. In embodiments, the key units may have a display for displaying location coordinates. These can be provided to the goods dispatcher for storage in the memory in the lock unit without the need for any special visit to determine the coordinates.

The significant increases in convenience are not at the expense of security. Since the lock unit will only open when the signals received by the key unit relate to a location stored in the memory, goods from a vehicle can only be unloaded in approved locations.

Typically, the location determination signals may be GPS signals though embodiments of the invention may also use other location determining systems, including purely by way of example GLONASS or LORAN. GPS is preferred as GPS equipment is readily available at relatively modest lost.

The invention also relates to the lock unit and to the key unit used in the lock system.

In another aspect, the invention relates to a method of operating a locking system comprising: a lock unit having a catch for securing an article and a memory for storing the location of an intended destination of the article and a key unit having an aerial for receiving location determining information, the method comprising the steps of: bringing the lock unit and the key unit together in close proximity; establishing a communications link between the lock unit and the key unit; receiving location information in the key unit; passing location information to the lock unit through the communications link; and releasing the catch if the location information received in the lock unit matches a location stored in the memory.

Embodiments of the invention will now be described, purely by way of example, with reference to the accompanying drawings in which:

FIG. 2 shows the lock device of the first embodiment of the invention;

FIG. 4 shows the key device for a system according to the first embodiment;

Figure 1:
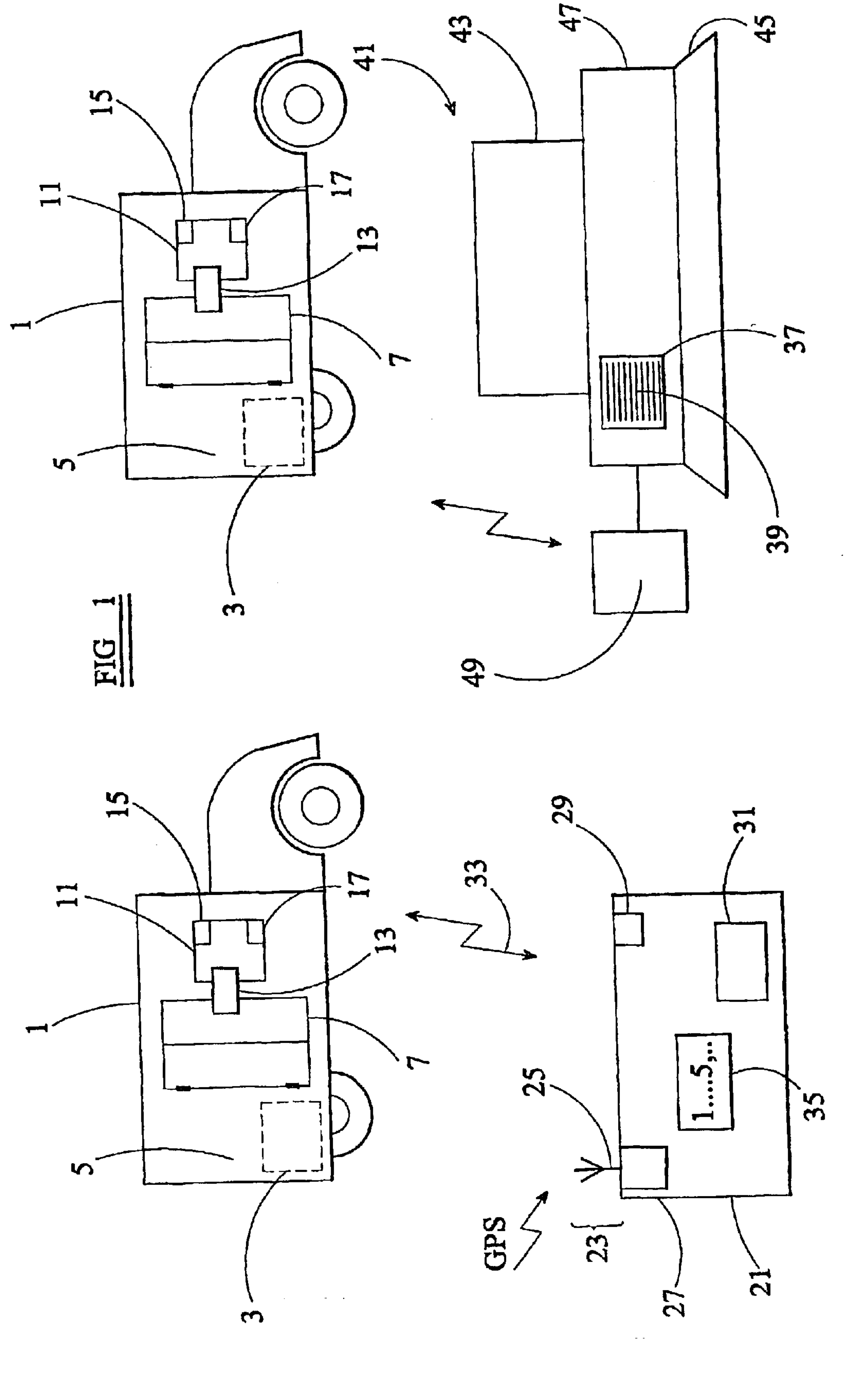
FIG. 1 shows a schematic drawing of a first embodiment of a system according to the invention.

Referring to FIG. 1, in the first embodiment of the invention, a vehicle 1 carries a cargo, load or article 3 in a cargo bay 5. A lock unit or member 11 has a releasable catch 13 for securing the cargo 3.

In the illustrated embodiment, the releasable catch 13 operates to lock the doors 7 of the cargo bay 5 of the vehicle 1. However, the releasable catch 13 can also be arranged to hold an article of cargo 3 in place in the cargo bay 5.

The lock unit also has a memory 15 for storing details of the intended destination of the cargo 3, and a communications interface 17.

The vehicle 1 is shown at a destination. A key unit or member 21 is provided at the destination. The key unit 21 has a system 23 for receiving location determining signals. In the present case, the system includes an aerial 25 for receiving GPS signals and a processor 27 for processing GPS signals. However, the invention is not restricted to GPS signals nor is it necessary that the processor for the GPS signals is located in the key unit 21. In other embodiments, the processor 27 may be located in the lock unit 11 or even remotely.

The key unit 21 also contains a communications interface 29 which is arranged to communicate with the communications interface 17 of the lock unit 11 in order to register the lock unit 11 and the key unit 21 together.

The skilled person will readily appreciate that there are many ways of crating a communication link 33 between the lock unit 11 and the key unit 21. Alternative embodiments of the invention may use electrical sockets, plugs or other connectors. In some arrangements, the key and lock units 11, 21 can be brought physically together to directly mate the key unit 21 with the lock unit 11. In other arrangements, an electrical connector, cable or lead may be used to link the key unit 21 and lock unit 11. The skilled person will be able to use any of a number of short range communications systems for connecting lock 11 and key 21 units. Direct electrical connection, infra-red or radio may be used as well.

In the embodiment shown, the communications interfaces 17, 29 are both arranged for short range secure radio communication. In this way, the units 11, 21 need to be brought into close physical proximity for activation, ensuring that a load 3 is not unloaded a short distance from the intended destination, but out of sight. In particular in the illustrative embodiment the interfaces are Bluetooth interfaces.

By allowing short range communication between lock 11 and key 21 units the key unit 21 may be mounted firmly to a wall or other support. This may make it easier to locate the aerial 25 for receiving the location determining signals, and to permanently position the aerial 25 where it is easily able to receive signals from GPS satellites wherever they are in the sky. The short range communications system preferably has a range no greater than 100 m, further preferably no greater than 20 m. If the range is too long, it may be possible to position vehicles close to the key unit 21 and in range whilst the vehicle is out of sight of the desired destination.

The communications interfaces 17, 29 preferably use security techniques to maintain the integrity of the signals and prevent unauthorized parties from accessing the lock and key units 11, 21. Such techniques are well known to those skilled in the art, and include pseudo-random number generation to encrypt data so that a transmission signal cannot be captured and reused to access the lock and key units, and scrambling using convolutional encoding. The Bluetooth standard is itself designed to be secure, and in many cases this security will be sufficient.

A switch, button or other actuation means 31 is provided on the key unit 21 to start the process to open the catch 13. By providing the switch 31 on the key unit 21 it is possible to ensure that the holder of the key unit has to knowingly open the lock, which helps reduce the risk that goods will be unloaded improperly simply by bringing the vehicle 1 into close proximity of the key unit 21 without informing the authorized parties. However, providing the switch 31 or indeed an additional switch on the lock unit 21 is also possible. It is also possible for the registration to occur automatically when lock 11 and key 21 units are brought into close proximity.

When the vehicle 1 arrives at its destination, switch 31 is actuated and the key unit 21 initiates communication with the lock unit 11 to register the key 21 and lock 11 units together by creating a the secure communications link 33 between the lock 11 and key 21 units. When the lock and key units 11, 21 are registered together, the location determining system 23 receives location determining signals on the aerial 25 and determines the location of the key unit 21. The processor 27 calculates the location from the location determining signals and the location is transmitted to the lock unit 11 through the link 33. In alternative embodiments, some or all of the processing may be carried out in the lock unit 11.

In the lock unit 11, the location is compared with a location stored in the memory 15. Keeping this aspect of the processing in the lock unit 11 may increase security. Alternative arrangements may allow the comparison to take place in the key unit 21, to reduce the processing load in the lock unit 11. The alternative approach may be useful if the communications line 33 is sufficiently secure. If the location received from the location determining system 21 is a location stored in the memory 15, the catch 13 is released to allow access to the cargo 3.

FIG. 1 also shows another vehicle 1 equipped with a like lock unit 11 located in closed proximity to a central server 41. In the embodiment the central server 41 is implemented in a conventional PC having a display 43, keyboard 45 and processor unit 47. The computer is connected to an interface 49 which can communicate with the interface 17 of a vehicle 1 in its location. A program 39 is stored in memory 37 to cause the PC to implement the invention, as is known. Any suitable server, dedicated terminal or the like may be used as the central server 41.

When the vehicle 1 arrives in the vicinity of the central serve 41, communication is established between the central server interface 49 and the interface 17 of the lock unit 11. In alternative embodiments, in addition to the interface 17 used for communication with the key unit 21, an additional interface, either of the same or a different type, may be provided on the lock unit 11 to carry out the communication between the lock unit 11 and the central server 41.

Once communication is established, the contents of the memory 15 can be read and updated with the destination of new cargo load under the control of the server 41.

The memory 15 is arranged to store details of the locations visited by the vehicle 1, i.e. for the location coordinates of locations where the lock unit is in communication with the key unit 21. When the vehicle returns to the central server 41, this information can be downloaded onto the central server 41 to determine whether the vehicle 1 has visited only approved destinations or whether the vehicle has also visited further destinations.

It will be appreciated that it is highly desirable that the communication between central server 41 and vehicle 1 is secure, to inhibit unauthorised access to the memory 15 and hence inhibit the programming of unauthorised locations in the memory 15. Accordingly, a high security protocol can be used for the communication between central server 41 and vehicle 1. The Bluetooth communication system is particularly suitable in this respect. However, improved security can also be provided using systems such as passwords, pseudo random number generators, and other security communication systems that are well in the art.

Conveniently, the key unit 21 also has a display 35 for displaying information such as the location of the key unit 21. Location information displayed on the display 35 can be passed to an operator of the central server 41 in order that the correct coordinates are programmed into the memory 15 of the lock unit 11 on the vehicle 1. In this way, set up of the system is extremely simple. All that is required is to deliver key units 21 to authorised delivery locations. These can then be plugged in and powered up, and the location read on the display 35. There is no need to visit the proposed location before delivering goods.

Furthermore, there is no need to install lock units 11 in al vehicles 1, since the lock unit 11 can simply be installed in vehicles 1 where it is required. The lock unit 11 does not require significant processing resources, and does not need direct access to the location determining signals. Accordingly, it is not necessary to provide an aerial 25 on the vehicle 1, or to connect the lock unit 11 directly into the vehicle electric systems, although this is obviously possible if required.

Figure 3:
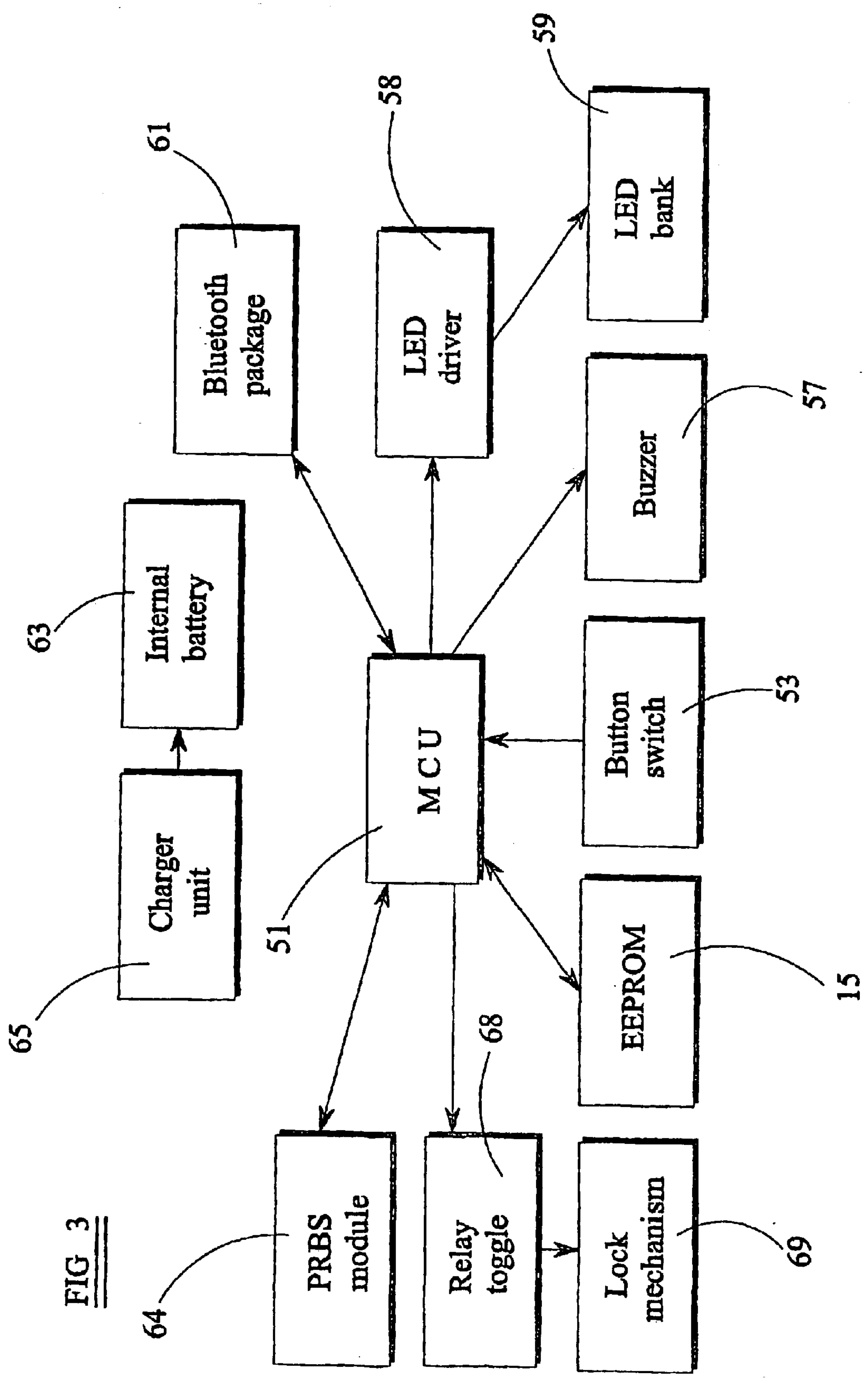
FIG. 3 shows a block diagram of the lock device of FIG. 2.

Referring to FIGS. 2 to 5, the individual components of the lock system will now be described in more detail. FIG. 2 shows the front panel of the lock unit 11. FIG. 3 illustrates a block diagram of the internal components of the lock unit 11.

The lock unit 11 includes a control unit 51, in communication with memory 15 which in the present embodiment is implemented as electrically erasable programmable read only memory (EEPROM). Button switches 53 allow input to the device. In the embodiment shown, the switches 53 are for power on/off 54, self test 55 and a switch 56 to initiate communication. Output is provided by a buzzer 57, and an LED driver 58 in cooperation with a LED bank 59. The lock unit 11 also includes a Bluetooth package 61 to act as an interface with the key unit 21. Power is provided from an internal battery 63 charged by a charger unit 65 in communication with a battery charging port 67. The central processor 51 is in communication with a relay toggle 68 connected to the block mechanism 69 which contains a catch 13 for securing a load. The mechanics of electrically actuated lock mechanisms are well known and will not be described here.

A pseudo-random binary sequence (PRBS) module 64 provides a sequence of pseudo-random numbers for use in secure transmission. These numbers may, for example, be used to increase the security of the transmission between the lock member 11 and the central server 41. PRBS modules 64 are commercially available.

Figure 5:
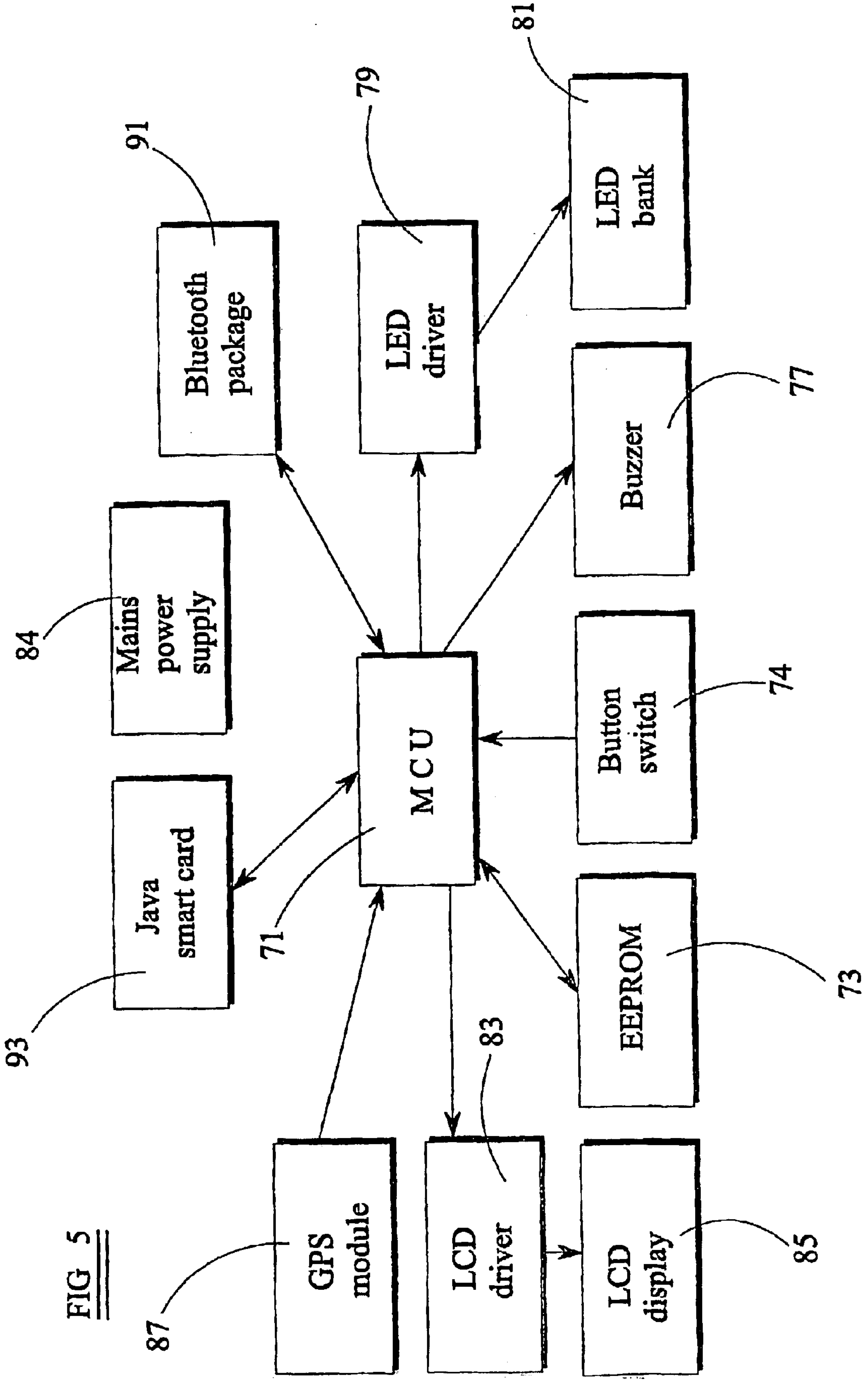
FIG. 5 shows a block diagram of the key device of FIG. 4.

Referring to FIGS. 4 and 5, the key unit or receiver station 21 includes a master control unit 71, EEPROM 73, button switches 74, a buzzer 77 and an LED driver 79 driving a LED bank 81. The button switches 74 include, in this example, a power switch 75, a self test switch 76 and a communications initiation switch 31. The unit also contains a LCD driver 83 driving an LCD display 85.

A GPS receiving module 87 is provided. These are commercially available and will not be described further.

In the embodiment shown, the receiver station 21 is driven by a mains power supply 84, though battery power would obviously also be possible.

The receiver station 21 includes; a Bluetooth interface 91 for communication with the lock unit 11.

A java smart card reader 93 is intended to interface with a java smart card 95. The unit 21 is arranged to operate only in combination with the smart card 95. As well as increasing security, this enables the user to be charged for using the system. This may be done using known systems for charging on a smart card 93, which will accordingly not be described further.

The complete system also includes a central server 41, as illustrated in FIG. 1. In this embodiment, the server 41 is implemented on a PC and is accessed only via a password system to reprogram the memory 15 in the lock unit 11. The software 39 stored in the memory 37 also enables an authorised user to retrieve information when the vehicle 1 returns to the central server 41. The information may include the date, time and the location the vehicle lock was opened.

In order to break into this system, a dishonest individual would need to steal a key unit 21, take it to a new location, and plug it in to read the location from the LCD display 85. Then the dishonest individual would need to get somebody with reprogramming rights to program the new sequence into a particular lorry's lock. However, the control computer 41 is kept secure and desirably very few users will have the right to reprogram the sequence into a lock. Furthermore, for increased security it can be arranged that at certain locks can only be reprogrammed by certain central servers 41, in order to further minimize the risk of reprogramming.

Alternative methods of breaking in simply do not work. The use of a secure communications protocol such as Bluetooth means that the encoded signals sent out cannot be copied or cracked to open the lock.

Furthermore, even if someone were to break in it would be obvious to the mother PC administrator that the lock has been opened at a different location or different time since all these features may be stored in a memory of the lock 15 and downloaded into the central server 41 on the lorry's return.

If a lock unit box is stolen and moved to a new location it will not open the lock in the new location since this new location will not be the location stored in the memory of the lock unit 15.

Figure 6:
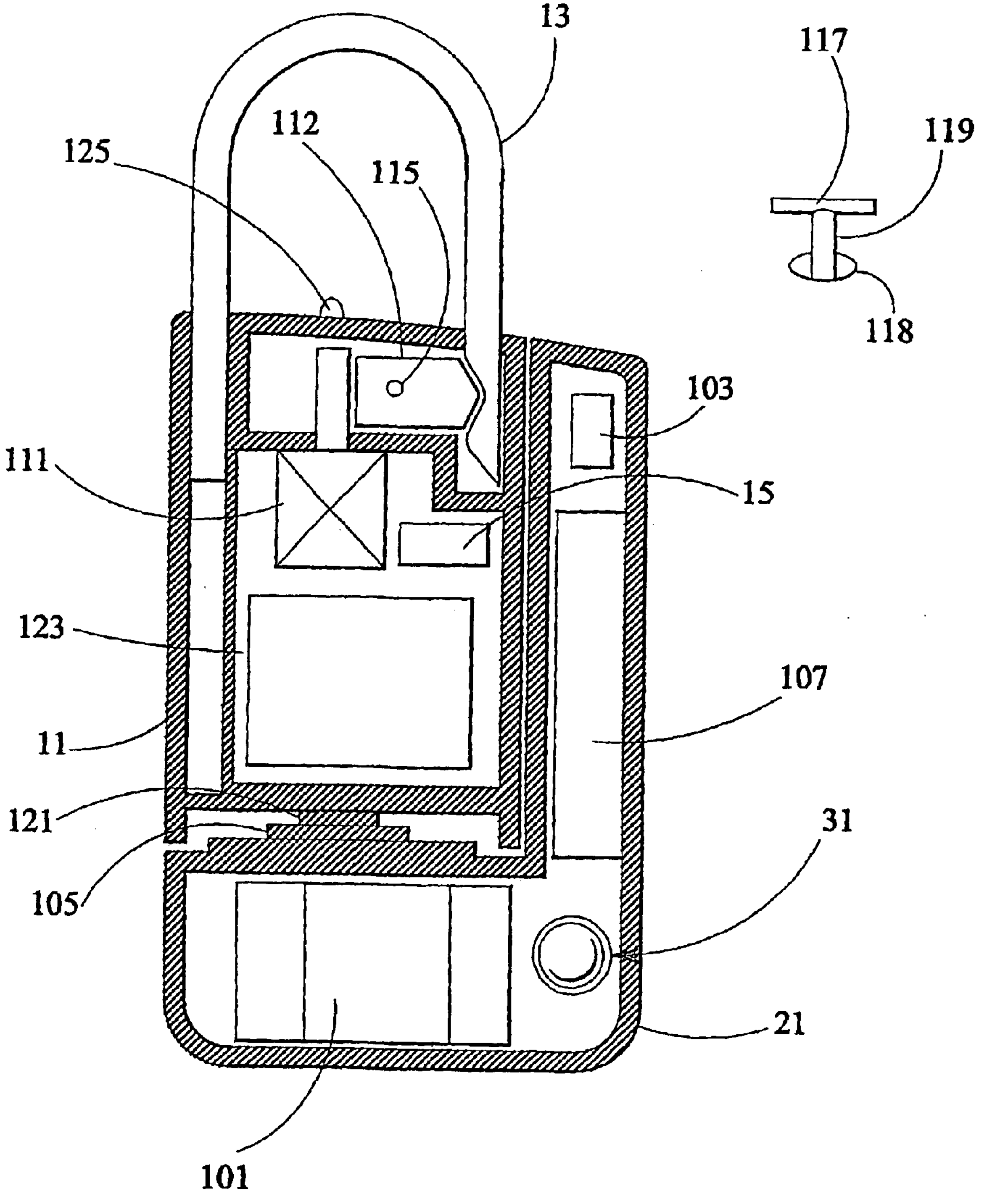
FIG. 6 shows a second embodiment of a lock and key unit according to the invention.

A second embodiment will now be described with reference to FIG. 6.

The case part of the lock 11 includes the following features: a catch or hasp 13 for securing the article, a programmable non-volatile memory 15, a solenoid 111 for actuating a locking pawl 112 to release the hasp 13, a hole 115 for an individual seal 117, a socket 121 for programming and communication with the power supply unit or "key" 21; and a processor 123 together with clock to calculate position from GPS signals. A data port 125, is also provided.

The tamper evident seal 117 has a pin 119 and a catch 118 arranged to engage in the hole 115. To remove the seal 117, the catch 118 is broken.

The power supply unit which acts as the "key" for the lock may consist of the following features: a battery 101 for supplying power to the lock solenoid 111 and GPS processor 123; an aerial 103 to receive GPS signals; a push button switch 31 to release the lock's hasp 13; a data port 105 to communicate with the socket 121 of the lock unit 11; and an LED display 107 or some other means of providing the user with essential information.

The operation of the lock is described below.

Before the start of a delivery trip, the lock's memory 15 is programmed with destination GPS co-ordinates using a purpose built programmer 41 communicating via the lock's data port 125. Infra-red may in particular be a good practical medium for this data exchange. It will be noticed that in this embodiment the communication between lock 11 and programmer 41 is not carried out in the same way as between lock 11 and key 21. It is nevertheless still necessary in the present embodiment, since the lock 11 does not have batteries, to supply power to the lock 11 during programming through socket 121. There may be a number of different destination locations programmed into the lock's memory 15.

On reaching a destination, the key 21 is married with the lock 11. On receiving electrical power, the lock's processor 123 immediately calculates its location. If this is in agreement with one of the locations programmed into the lock's memory 15 the lock 11 will be allowed to open on activation of the hasp release key 31 situated on the key 21. Colored LED lights or some other means of display can also be situated on the key 21 to provide the user with essential status information, such as battery charge, whether or not the lock may be opened, etc.

In practice, it will be necessary to provide a time tolerance zone of perhaps 10 minutes. This is because the GPS aerial 103 must be able to "see" the sky, and as man warehouse loading bays are covered it will also be necessary to hold the last received satellite signals in the memory for a short while. This may be achieved by the following means. A processor housed within the key 21 continuously records GPS signals over a short time period. As new signals are added, old signals are deleted. If a GPS aerial enters a shadow area, the last recorded signals are retained until signal reception is resumed. By this means the lock's processor 123 will be able to calculate its position from the last recorded GPS signals provided a time allowance is programmed into the lock's GPS processor (normally all calculation is carried out at the current time.)

It will be noted that the lock system according to the first embodiment of the invention uses a fixed key unit 21 which can accordingly be connected to a permanent aerial 23. The lock system according to the first embodiment accordingly does not require such a time tolerance, and so has increased security.

In a modification of the second embodiments, the key 21 may be connected to an outside GPS aerial by a cable, in which case a time tolerance zone would not be necessary, thereby increasing the level of security.

The tamper evident seal 117 has a pin 119 arranged to interact with a hole 115 in the locking pawl 112 to provide security and also a temporary means of securing the lock, for example securing the door of a part unloaded van during a break. It is envisaged that once opened, a lock may remain in the open condition until the key 21 is removed. Tamper evidence is provided due to the fact that the numbered seal 117 is broken when the hasp 13 is released (such tamper evident seals are well known).

Each time the lock 11 is opened, its identity together with the time and date can be recorded by a processor housed in the key. From time to time this data is transmitted to a central computer for security cross-checking and client charge calculation.

Thus, the second embodiment of the invention likewise provides a convenient high security locking system with minimal components required in the lock unit 11 itself.

The above embodiments are purely by way of example and the skilled person will readily conceive other alternatives. For example, alternative memory, display and control systems may be used. The system may be used for securing loads on any form of transport, not just road vehicles.

What is claimed is:

1. A lock system comprising:

a lock unit having a releasable catch for securing an article to be locked, and a memory for storing information about an intended destination of the article;

a key unit having a means for receiving location determining signals;

wherein the lock unit and key unit are arranged to register together; and the lock system further comprising a means operable to release the catch when the lock unit and the key unit are registered and when a location determined from the location determining signals received in the key unit is the intended destination stored in the memory in the lock unit.

2. A lock system according to claim 1 further comprising a radio transceiver in the lock unit and another radio transceiver in the key unit for communicating with each with each other to register the lock unit and the key unit together.

3. A lock system according to claim 1 further comprising an electrical connector on the lock unit and another electrical connector on the key unit arranged to be electrically interconnected to register the lock unit and key units together.

4. A lock system according to claim 1 further comprising a smart card reader.

5. A lock system according to claim 1 wherein a signal transmitted from key unit to lock unit includes GPS coordinates.

6. A lock system according to claim 1 wherein when the lock unit and key unit cooperate to release the catch and the lock unit stores location coordinates in the memory.

7. A lock system according to claim 1 further comprising a central server for communicating with the lock unit to store information in the memory and to download information from the memory.

8. The lock system according to claim 1 wherein the lock unit and key unit are arranged to register together in a close physical proximity of less than or equal to 100 meters.

9. A lock system comprising:

a lock unit having a releasable catch for securing an article to be locked, a memory for storing information about an intended destination of the article, and an interface; and a key unit having an aerial for receiving location determining signals and another interface for communicating with the lock unit;

wherein the other interface on the key unit can be brought into short range communication with the interface on the lock unit to transmit location information from the key unit to the lock unit;

and wherein the lock unit releases the catch only when the lock unit receives location information that matches the intended destination stored in the memory.

10. The lock system according to claim 9 wherein the short range communication is less than or equal to 100 meters.

11. A lock system comprising:

a lock unit having a releasable catch for securing an article to be locked, and a memory for storing information about an intended destination of the article; and a key unit, wherein the lock unit and key unit are arranged in a proximity less than or equal to 20 meters to cooperate to release the catch when a location determined from location determining signals is the intended destination stored in the memory in the lock unit.

12. A key unit for use with a lock unit, the lock unit having a catch for securing an item and a memory for storing an intended destination of the item, the key unit comprising:

an interface for transmitting signals to the lock unit to register the lock and key units together;

a receiver for receiving location determining signals and determining the location of the receiver, wherein when the key unit registers with the lock unit in a proximity less than or equal to 100 meters, the key unit transmits the location determined from the location determining signals to the lock unit using the interface so that the lock unit can compare the location transmitted with the stored in the memory and release the catch when the intended destination matches the location.

13. A lock unit for use with a key unit having a receiver for receiving location determining signals, the lock unit comprising:

a catch for securing an article to be locked;

a memory for storing an intended destination of the article; and an interface for interfacing with the key unit to register the lock unit and key units together for receiving location determining information from the key unit, wherein the lock unit is arranged to release the catch to release the article when the lock unit is registered with the key unit having the location determining information matching the intended destination stored in the memory.

14. The lock unit according to claim 13, wherein the lock unit resisters with the key unit in a proximity less than or equal to 100 meters.

15. The lock system according to claim 14 wherein the close physical proximity is less than or equal to 20 meters.

16. A method of operating a locking system comprising a lock unit having a catch for securing an article and a memory for storing the location of an intended destination of the article and a key unit having an aerial for receiving location determining information, the method comprising the steps of:

bring the lock unit and the key unit together in close proximity;

establishing a communications link between the lock unit and the key unit;

receiving the location determining information in the key unit;

passing the location determining information to the lock unit through the communication link; and releasing the catch if the location determining information received in the lock unit matches the location stored in the memory.

17. The method of operating a lock system according to claim 16, further comprising bringing the lock unit and key unit in close proximity of less than or equal to 100 meters.

* * * * *